(12) United States Patent  
Sano

(10) Patent No.: US 6,244,125 B1
(45) Date of Patent: Jun. 12, 2001

(54) MOVEMENT TRANSFORMING DEVICE AND POWER STEERING APPARATUS

(75) Inventor: Osamu Sano, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/362,371

(22) Filed: Jul. 28, 1999

(30) Foreign Application Priority Data

Jun. 10, 1998 (JP) .................................................. 11-164418
Jul. 29, 1998 (JP) .................................................. 10-214582

(51) Int. Cl.⁷ ............................... B62D 5/04; F16H 25/20
(52) U.S. Cl. ................... 74/388 PS; 74/89.15; 74/459; 74/422; 74/499; 180/443; 310/83
(58) Field of Search .................................... 74/89.15, 459, 74/388 PS, 422, 424.8 R, 499; 180/443, 444; 310/83

(56) References Cited

U.S. PATENT DOCUMENTS

| 2,482,082 | * | 9/1949 | Wahlberg | 74/459 |
| 2,616,302 | * | 11/1952 | Wahlmark | 74/459 |
| 4,322,987 | | 4/1982 | Gärtner | 74/89.15 X |
| 4,766,970 | * | 8/1988 | Shimizu | 180/444 |
| 4,856,356 | * | 8/1989 | Gartner | 74/424.8 R |
| 5,533,417 | * | 7/1996 | Devenyi | 74/424.8 R |

FOREIGN PATENT DOCUMENTS

| 656930 | 7/1986 | (CH) . |
| 83 110 08 | 5/1985 | (DE) . |
| 41 430 20 | 1/1993 | (DE) . |
| 0410032 | 1/1991 | (EP) . |
| 0606509 | 7/1994 | (EP) . |
| 0896917 | 2/1999 | (EP) . |
| 59-9351 | 1/1984 | (JP) . |
| 59-12898 | 3/1984 | (JP) . |
| 61-191468 | 8/1986 | (JP) . |

* cited by examiner

*Primary Examiner*—Allan D. Hermann

(57) ABSTRACT

Two of the three feed rings to beheld in a rotating cylinder are fitted into respective mounting holes, which are formed on both end of the rotating cylinder so as to have circular openings, and are fixed by locking rings so as not to slip off. The center feed ring is fitted into a mounting portion, which is formed at a predetermined position on a circumferential wall of the rotating cylinder so as to have a slit-shaped opening, and is engaged with a thread groove formed on a rack shaft which pierces through an axial center of the rotating cylinder. Moreover, a bearing is fitted inside the rotating cylinder. The bearing is brought into contact with a circumference of the rack shaft so as to stand a radial load applied to the rack shaft. Such a structure realizes firm engagement between the feed rings and moving shaft, and thus a movement transforming device, which has a simple and compact structure capable of secure movement transformation between rotational movement and linear movement.

6 Claims, 12 Drawing Sheets

MOVEMENT TRANSFORMING DEVICE AND POWER STEERING APPARATUS

BACKGROUND OF THE INVENTION

1. Field of the Invention

The present invention relates to a movement transforming device to be used for transforming rotational movement into linear movement or transforming linear movement into rotational movement, and relates to a power steering apparatus where the movement transforming device is used as a main component.

2. Description of the Background Art

An electric power steering apparatus, which is constituted so that an electric motor for steering assistance is driven according to a steering operation and a rotating force of this motor is transmitted to a steering mechanism so as to assist steering, is put to practical use. Most of such power steering apparatuses are constituted so that the motor for steering assistance is provided around a steering shaft (a rack shaft or the like in a rack-and-pinion steering mechanism) connected with tire wheels for steering (generally, right and left front tire wheels). A rotating force of the motor is directly transmitted to the steering shaft and thus the steering shaft is moved in the axial direction so that the steering is assisted.

In order to realize such a constitution, a movement transforming device for transforming rotation of the motor into movement of the steering shaft in the axial direction is required. As for a conventional device, as disclosed in Japanese Patent Application Laid-Open No. 61-191468 (1986), a movement transforming device utilizing a ball screw is widely used.

In the movement transforming device disclosed in the Japanese Patent Application Laid-Open No. 61-191468 (1986), a thread groove is formed on an outer circumference of the steering shaft, whereas a ball nut, which is fitted into the thread groove via a number of balls, is provided in a housing for supporting the steering shaft with movement of the ball nut in the axial direction being restricted. The rotating force of the motor for steering assistance is transmitted to the ball nut, and the steering shaft formed with the thread groove is moved in the axial direction by utilizing a screw movement of the thread groove due to the rotation.

Since such a conventional movement transforming device transforms the rotation of the ball nut into the movement of the steering shaft in the axial direction according to rolling movement of the balls intervening therebetween, high transmission efficiency is obtained. Moreover, since the apparatus including the motor for steering assistance can be structured compactly within a limited space around the steering shaft, the apparatus can meet a demand in reducing an installation space.

However, in the above-mentioned conventional ball-screw type movement transforming device, high accuracy is required for the thread groove formed on the outer circumference of the steering shaft, and thus there arises a problem that numerous processing steps are required. Moreover, a lot of labor is required for adjusting the fitting condition between the steering shaft and the ball nut via the balls, and thus there arises a problem that a number of assembling steps is increased.

In addition, since the plurality of balls, fitted into the thread groove, are circulated by a circulating mechanism provided relative to the ball nut, there arises a problem such that the structure of the ball nut becomes complicated. Further, according to the circulation of the balls in the circulating mechanism, generation of ball collision noises are not avoidable, and such noises would be heard by a driver as harsh grating sounds.

Under these circumstances, it is eager to realize a new compact movement transforming device which is capable of solving the aforementioned problems carried by the ball-screw type movement transforming device for transmitting the rotation of the motor for steering assistance to the steering shaft with high transmission efficiency equivalent to that of the ball-screw type movement transforming device.

As a movement transforming device which can respond to many movements, Japanese Patent Application Open No. 59-12898 (1984) discloses a movement transforming device, for example. The movement transforming device disclosed in Japanese Patent Application Open No. 59-12898 (1984) includes a moving shaft supported movably in the axial direction, a rotating cylinder which is supported rotatively on its axis and coaxially surrounds a periphery of the moving shaft, and a plurality of feed rings which are supported eccentrically to an inside of the rotating cylinder and whose inner surfaces are engaged with a circumferential surface of the moving shaft at one portion in the circumferential direction. As for the feed rings, rolling bearings, which have a plurality of rolling members such as balls and rollers between their inner rings and outer rings, are used where the inner rings having their inner diameter are sufficiently larger than an outer diameter of the moving shaft.

In addition, Japanese Patent Application Laid-Open No. 59-9351 (1984) discloses a similar movement transforming device in which a thread groove is formed on an outer circumferential surface of a moving shaft, and engaging projections provided around inner rings of feed rings are engaged with the thread groove so that their engagement is reinforced.

In these conventional movement transforming devices, when the rotating cylinder rotates on its axis, the feed rings held on the rotating cylinder rotate with the inner rings being engaged with the moving shaft, and the moving shaft is moved in the axial direction by an action of a component of the force in the axial direction of the engagement portion with the inner ring, and thus the rotation of the rotating cylinder is transformed into the axial movement of the moving shaft.

Since the rolling movement of the feed rings at this time is generated via the rolling members such as balls and rollers intervening between the inner rings and outer rings, the above-mentioned movement transformation displays the transmission efficiency which is substantially equivalent to that of the conventional ball-screw type movement transforming device. Moreover, since these rolling members are held between the inner rings and outer rings with the relative positions of the rings unchanged, collision of the rolling members does not occur, and thus quietness can be improved. Further, the rotating cylinder has a simple structure where the plurality of feed rings (bearings) are held to its inner side, and thus this device can achieve a greatly simple structure compared with the conventional ball-screw type movement transforming device.

However, even in the movement transforming device having the above-mentioned structure, it is indispensable for adjusting the engagement condition between the feed rings and the moving shaft to perform the satisfactory movement transforming operation.

An explanatory diagram of FIG. 1 shows the engagement condition between the feed rings and the moving shaft of the movement transforming device disclosed in Japanese Patent Application Open No. 59-12898 (1984).

As shown in FIG. 1, a plurality of feed rings 63 (only one is shown) are constituted so that a plurality of balls are intervened between inner rings 63a and outer rings 63b. The feed ring 63 is inserted into a mounting hole 60 which has a width corresponding to an outer diameter of the outer ring 63b and pierces through a predetermined position of a rotating cylinder 6. The feed ring 63 is constituted so that a block-shaped pressure member 61 which is inserted from one side of the mounting hole 60 is brought into contact with a half portion of the outer ring 63b. Here, the pressure members 61 are restricted collectively by cylindrical springs 62 mounted to the outside of the rotating cylinder 6 so as not to slip out of the mounting holes 60. In this state, the inner rings 63a of the feed rings 63 are engaged with the moving shaft 7 in inner sides of their contact positions with the pressure members 61.

In this conventional structure, the engagement condition between each of the plurality of feed rings 63 and moving shaft 7 is determined by the accuracy of a dimension ("X" in FIG. 1) between inner and outer surfaces of each of the pressure members 61. Therefore, when adjusting the engagement condition, it is required to adjust a dimension of the pressure members 61 which have a non-uniform section formed with the inner surface corresponding to an external shape of the feed rings 63 and the outer surface corresponding to an external shape of the rotating cylinders 6. As a result, there arises a problem such that numerous processing steps are required.

In addition, since the engaging strength between the feed rings 63 and moving shaft 7 depends on spring forces of the springs 62 elastically contacting with the outer surfaces of the pressure members 61, it is difficult to obtain sufficient engaging strength. As a result, as mentioned about the power steering apparatus, it is difficult to apply this structure to usage in which the transmission of a large force between the rotating cylinder 6 and moving shaft 7 is required.

As disclosed in Japanese Patent Application Laid-Open No. 59-9351 (1984), the reinforcement of the engagement can be improved by forming a thread groove on the outer circumferential surface of the moving shaft. However, even in the structure disclosed in Japanese Patent Application Laid-Open No. 59-9351 (1984), it is required for obtaining the suitable engagement condition between the feed rings and moving shaft to improve accuracy in processing and assembling of respective members. As a result, a large number of processing steps including adjustment of a dimension of a spacer coming into contact with one side of the feed ring are required.

Furthermore, in the case where a power steering apparatus is constituted by using the above-mentioned movement transforming device as a main component, an external force, such as a reaction force from tire wheels for steering connected with both ends of a steering shaft as the moving shaft, is applied to the steering shaft, and radial load to various directions acts. However, in the movement transforming device having the above-mentioned structure, the moving shaft is supported in the radial direction only by the plurality of feed rings along a lengthwise range of the rotating cylinder. However, these feed rings are engaged with the circumferential surface of the moving shaft at one portion in the circumferential direction, and the feed rings only can bear the radial load directing to the respective engagement positions. As a result, it is difficult to stably support the moving shaft on which the radial load directing to various directions is acting.

In order to solve these difficult problems in the conventional structure, three or more feed rings are used, and their engagement positions are set at substantially uniform intervals in the circumferencial direction so that the feed rings bear the radial load directing towards various directions by means of their synergistic action. However in this case, the moving shaft is supported by the feed rings at one point of the respective engagement positions, and thus in order to obtain desired capability of bearing the radial load, it is inevitable to enlarge the size of the feed rings. Moreover, this causes a problem such that the size of the rotating cylinder for holding the three or more feed rings with such a large size becomes larger, and thus it is difficult to miniaturize the movement transforming device having this structure equivalently to the ball-screw type movement transforming device.

The above-mentioned problem can be solved by proving a bearing for supporting the moving shaft in the radial direction to a housing inner diameter portion in the outside of the end portion of the rotating cylinder. However, the thread groove for reinforcing the engagement with the feed rings is formed on the outer circumferential surface of the moving shaft as mentioned above, and this thread groove slidably contacts with the bearing provided as mentioned above according to the movement of the moving shaft, and eccentric abrasion is generated on the bearing so that the satisfactory supporting state cannot be held. Moreover, the shape of the thread groove is changed by the sliding contact with the bearing, and thus there arises a problem such that the engagement condition of the feed rings is deteriorated.

BRIEF SUMMARY OF THE INVENTION

The present invention has been achieved with the above points in view. It therefore is a first object of the present invention to provide a movement transforming device having a simple structure which is capable of easily adjusting an engagement condition after assembly, securely realizing the firm engagement between feed rings held to a rotating cylinder and a moving shaft, and securely transforming rotational movement of the rotating cylinder into linear movement of the moving shaft and vice versa, and to provide a power steering apparatus using the movement transforming device.

It is a second object of the present invention to provide a movement transforming device having a simple structure which is capable of stably supporting a moving shaft without enlarging sizes of feed rings and a rotating cylinder by allowing a bearing fitted and supported in the rotating cylinder to bear radial load applied to the moving shaft, and securely transforming rotational movement into linear movement of the moving shaft and vice versa, and to provide a power steering apparatus using the movement transforming device.

A first aspect of the present invention provides a movement transforming device, comprising: a moving shaft supported into a housing movably in the axial direction, a thread groove being formed on an outer circumferential surface of the moving shaft; a rotating cylinder, supported inside the housing rotatively on its axis, coaxially surrounding an outside of the moving shaft; and three or more feed rings having their axial centers inclined by an angle substantially equal with a lead angle of the thread groove, eccentrically held into the rotating cylinder, each having its inner circumferential surface engaged with the thread groove of one position in the circumferential direction; whereby rolling movement of the feed rings along the thread groove transforms rotation of the rotating cylinder into movement of the moving shaft or transforms the movement of the moving shaft into the rotation of the rotating cylinder, characterized in that the three or more feed rings are arranged along the axial direction of the rotating cylinder, the two feed rings on both ends are fitted into mounting portions, which are formed on both end surfaces of the rotating cylinder so as to have circular openings corresponding to axial cross sectional shapes of the two feed rings, via the respective openings, the rest of the feed rings is fitted into a mounting portion, which are formed in a halfway circumferential wall of the rotating cylinder so as to have a slit-shaped opening corresponding to a side elevational shape of the feed ring, via the opening.

In the movement transforming device according to the first aspect of the present invention, the two feed rings positioned on outer sides held to the rotating cylinder are fitted to be fixed into the mounting portions, which are formed on both end surfaces of the rotating cylinder so as to have the openings corresponding to axial sectional shapes of the two feed rings, namely, the two feed rings are fixed in such a manner that their whole outer circumferential surfaces are restricted, and their inner circumferential surfaces are engaged with the thread groove on the outer circumference of the moving shaft with high rigidity. Whereas the center feed ring is fitted into a mounting portion, which is formed on the rotating cylinder so as to have a slit-shaped opening, and the engagement conditions of all the feed rings are made to be appropriate by adjusting the positions of the center feed ring.

A second aspect of the present invention depending from the first aspect provides the movement transforming device, wherein an engaging position between the rest of the feed rings and the thread groove is set in an opposite side to the opening of the mounting portion so as to be different in the circumferential direction from engaging positions of the two feed rings on the both ends, further comprising engagement adjuster for pressing outer peripheries of the rest of the feed rings towards the opening of the mounting portion so as to collectively adjust the engagement conditions of the three or more feed rings with the thread groove, the engagement adjuster being mounted to the circumferential wall of the rotating cylinder.

In the movement transforming device from the second aspect of the present invention, when the center feed ring is pressed by operating the engagement adjuster so as to make the engagement condition with the moving shaft to be appropriate, the engagement conditions of the two feed rings on the both ends, whose engagement is set in positions different from each other in the circumferential direction, are made to be appropriate collectively. As a result, trouble and labor required for the adjustment are reduced.

In addition, a power steering apparatus from the first aspect of the present invention, for transmitting a rotational force of a motor to be driven according to steering to a steering shaft and moving the steering shaft in the axial direction so as to assist the steering, uses the movement transforming device according to the first or second aspect as a main component.

In the power steering apparatus of the first aspect of the present invention, as a transmission mechanism which covers a range from a motor for steering assistance to the steering shaft, the movement transforming device of the present invention, executes the secure movement transformation with a simple structure and with a low operating noise. As a result, the power steering apparatus is provided with excellent quietness, in which the movement transforming device including the motor can be arranged compactly around the steering shaft.

A third aspect of the present invention provides a movement transforming device, comprising: a moving shaft supported inside a housing movably in the axial direction, a thread groove being formed on an outer circumferential surface of the moving shaft; a rotating cylinder, supported inside the housing rotatively on its axis, coaxially surrounding an outside of the moving shaft; and a feed ring having its axial center inclined by an angle substantially equal with a lead angle of the thread groove, eccentrically held inside the rotating cylinder, having its inner circumferential surface being engaged with the thread groove at one position in the circumferential direction; whereby rolling movement of the feed ring along the thread groove transforms rotation of the rotating cylinder into movement of the moving shaft or transforms the movement of the moving shaft into the rotation of the rotating cylinder, further including bearing fitted to be held inside the rotating cylinder and coming in contact with the outer circumference of the moving shaft to stand a radial load applied to the moving shaft.

In the movement transforming device from the third aspect of the present invention, the bearing, which is fitted to be held inside the rotating cylinder for holding a feed ring, comes in contact with the outer circumference of the moving shaft so as to stand the radial load to be applied to the moving shaft. Since the relative engaging position between the shoulder portion of the thread groove and the feed ring does not change with respect to the rotating cylinder which rotated outside the thread groove, and thus the contact position of the shoulder portion of the thread groove with the bearing does not change, a friction due to their sliding is not generated. As a result, a satisfactory supporting state is maintained stably, and it is not necessary to enlarge the size of the feed ring for bearing the radial load.

In addition, a fourth aspect of the present invention depending from the third aspect provides the movement transforming device, wherein a position where the bearing is held inside the rotating cylinder is aligned with a supported position of the rotating cylinder inside the housing in the axial direction.

In the movement transforming device from the fourth aspect of the present invention, the bearing inside the rotating cylinder is arranged in a position which is aligned with the supported position where the rotating cylinder is rotatably supported inside the housing. As a result, rotating moment in the axial direction is prevented from occurring by the radial load applied to the bearing.

In addition, a power steering apparatus from a second aspect of the present invention, for transmitting a rotating force of the motor driven according to steering to the steering shaft so as to move the steering shaft in the axial direction and assist the steering, uses the movement transforming device from the third or fourth aspect of the present invention as a main component.

In the power steering apparatus from the second aspect of the present invention, as a transmission mechanism which covers a range from a motor for steering assistance to the steering shaft, the movement transforming device of the present invention, executes the secure movement transformation with a simple structure and with a low operating noise. As a result, the power steering apparatus is provided with excellent quietness, in which the movement transforming device including the motor can be arranged compactly around the steering shaft.

The above and further objects and features of the invention will more fully be apparent from the following detailed description with accompanying drawings.

DETAILED DESCRIPTION OF THE PREFERRED EMBODIMENTS

Figure 1:
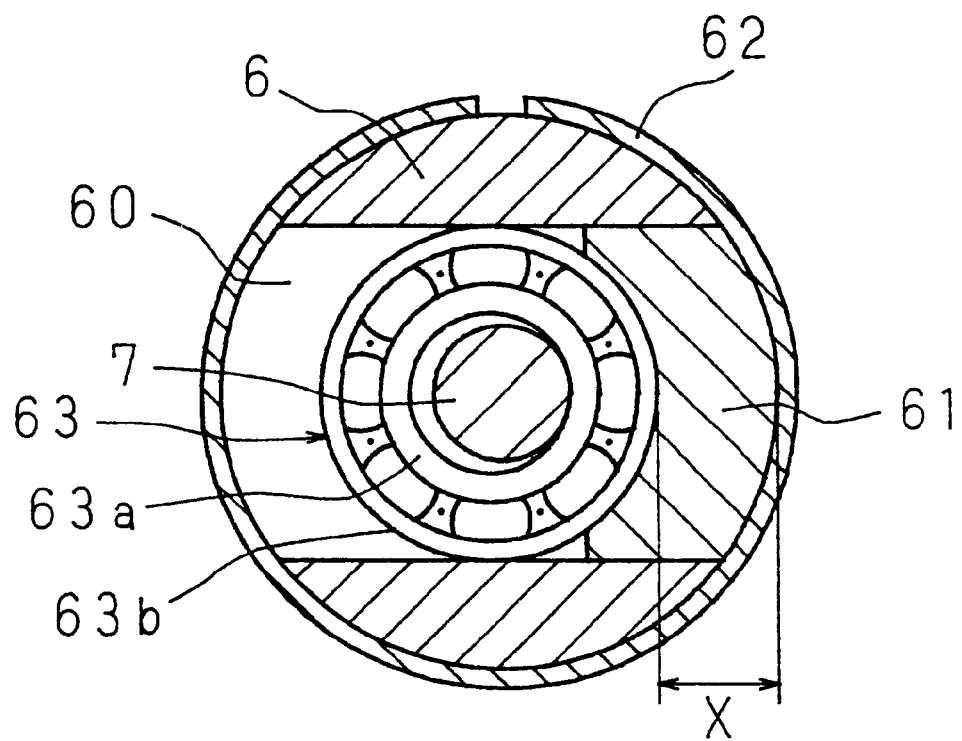
FIG. 1 is an explanatory diagram showing an engagement condition between a feed ring and a moving shaft in a conventional movement transforming device.
Figure 2:
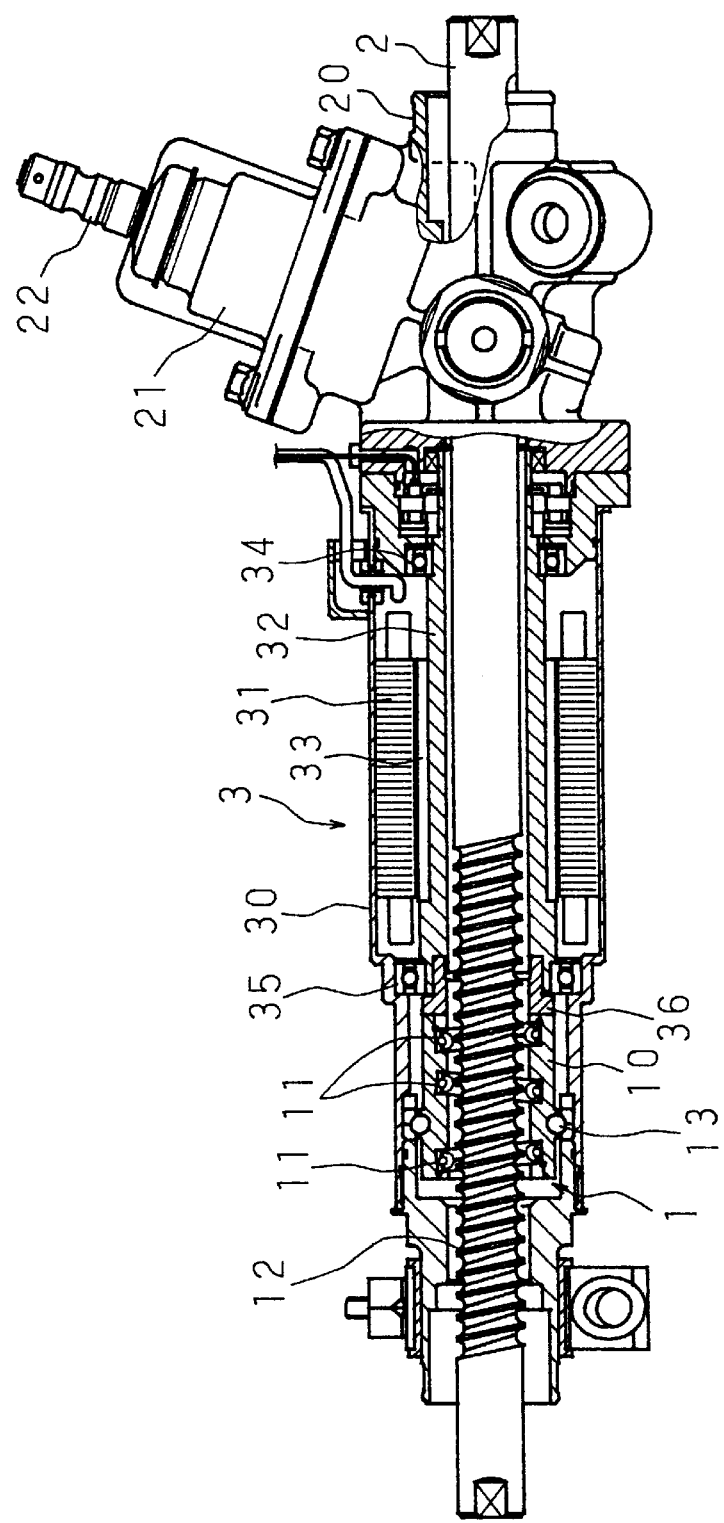
FIG. 2 is a view, partially in cross-section, of a constitution of an essential portion of a power steering apparatus in a first embodiment having a movement transforming device according to the present invention.

There will be detailed below the present invention with reference to the drawings showing the embodiments. FIG. 2 is a front view, partially in cross-section, showing a constitution of an essential portion of a movement transforming device and a power steering apparatus having thereof in a first embodiment according to the present invention.

A rack shaft 2 as a moving shaft is supported to an inside of a cylindrical rack housing 20 movably in the axial direction, and is extended in the right-and-left directions of vehicles's body, not shown. Both ends of the rack shaft 2 which project from both sides of the rack housing 20 are connected with tire wheels for steering (generally, right and left front tire wheels), not shown, via tie rods.

A pinion housing 21 is provided continuously to a halfway portion of the rack housing 20 so that their axial centers cross each other. A pinion shaft 22 is supported inside the pinion housing 21 rotatively on its axis. In FIG. 2, only an end of the pinion shaft 22 projects from the upper portion of the pinion housing 21 is shown. The pinion shaft 22 is connected to a steering wheel, not shown, via the projecting end, and it rotates on its axis according to an operation of the steering wheel.

A pinion, not shown, is formed integrally with a lower portion of the pinion shaft 22 and extends inside the pinion housing 21. Moreover, rack teeth, not shown, are formed over a suitable length of the rack shaft 2, supported into the rack housing 20, including the cross position of the pinion housing 21. The rack teeth are engaged with the pinion on the lower portion of the pinion shaft 22. Rotation of the pinion shaft 22 due to the operation of the steering wheel is transformed into movement of the rack shaft 2 in the axial direction by the engagement of the pinion with the rack teeth, and the movement of the rack shaft 2 in the rack housing 20 is transmitted to the right and left tire wheels for steering via the tie rods, not shown. In such a manner, a rack-and-pinion type steering mechanism, which is steered according to the operation of the steering wheel, is constituted.

The power steering apparatus shown in the drawing assists the steering executed in the above manner by means of a rotating force of an electric motor. A steering assistance motor 3 is composed as a three-phase brushless motor in which a stator 31 fixed to an inner circumferential surface of a cylindrical motor housing 30 and a rotor 32 coaxially arranged inside the stator 31 are provided in the motor housing 30 which is composed integrally by enlarging a diameter over a suitable length of the halfway portion of the rack housing 20 surrounding the rack shaft 2.

The rotor 32 is composed so as to hold a magnetic pole 33, which faces the inner surface of the stator 31 with a slight gap, to an outer circumference of a cylindrical member having an inner diameter larger than an outer diameter of the rack shaft 2. The rotor 32 is supported rotatably about the axis of the motor housing 30 by means of a pair of right and left ball bearings 34 and 35, and rotates in both directions according to energizing of the stator 31.

The rotation of the rotor 32 as a rotating member of the motor 3 is transformed into movement of the rack shaft 2 in the axial direction by the operation of a movement transforming device 1 according to the present invention which is provided to one side of the rotor 32 so as to be transmitted.

The movement transforming device 1 includes a rotating cylinder 10 which surrounds the outside of the rack shaft 2 as a moving shaft, a plurality of feed rings 11 (three in the drawing) are arranged and held inside the rotating cylinder 10 in the axial direction, and a thread groove 12 is formed on an outer circumferential surface of the rack shaft 2 over a predetermined length including the inside of the rotating cylinder 10. The rotating cylinder 10 is supported rotatably to an extended portion of the motor housing 30 as a housing by a four-point contact ball bearing 13 whose inner ring is formed integrally in the halfway portion of the rotating cylinder 10. The rotating cylinder 10 is coaxially connected with one end portion of the rotor 32 via a coupling bracket 36. Such a constitution rotates the rotating cylinder 10 on its axis according to the rotation of the motor 3.

Figure 3:
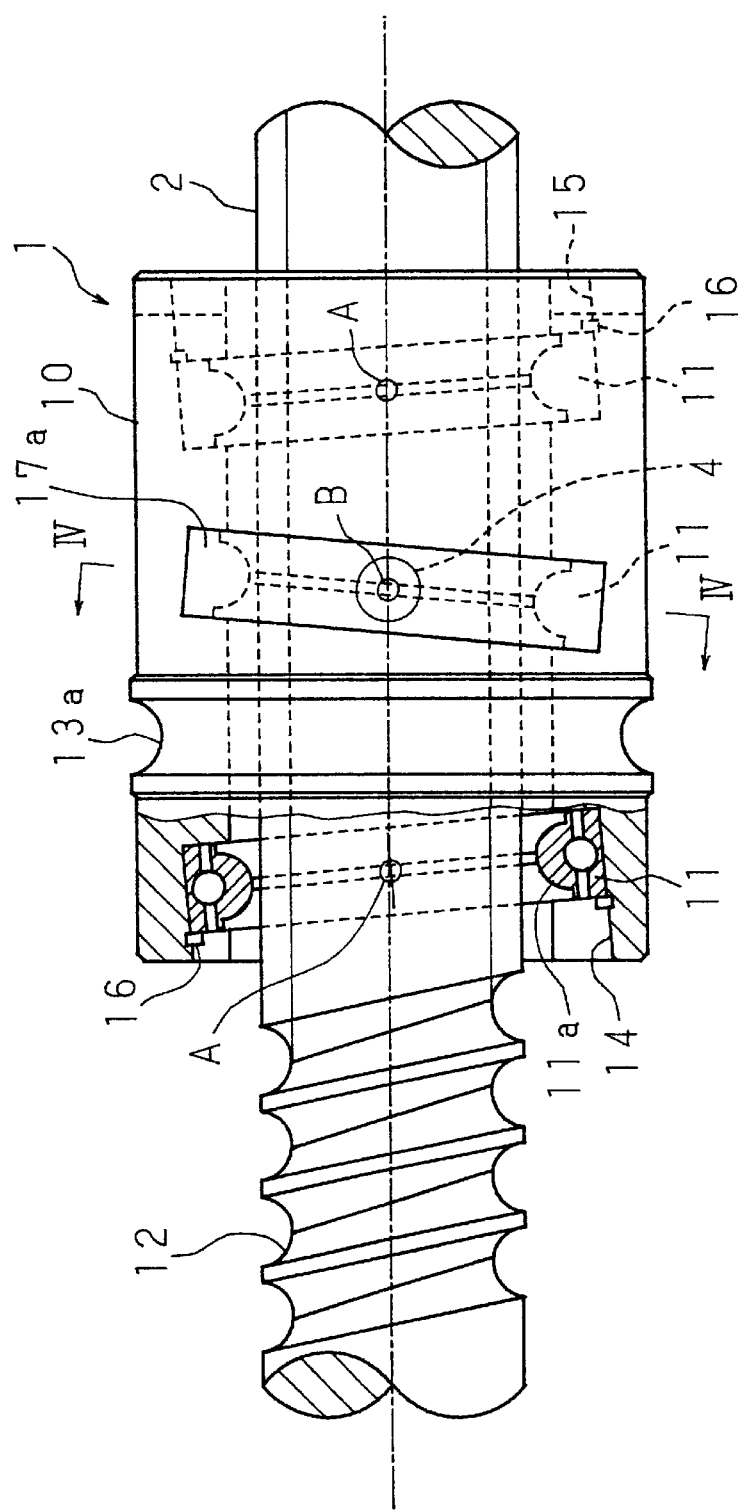
FIG. 3 is a view, partially in cross-section, of a constitution of the movement transforming device in the first embodiment according to the present invention.
Figure 4:
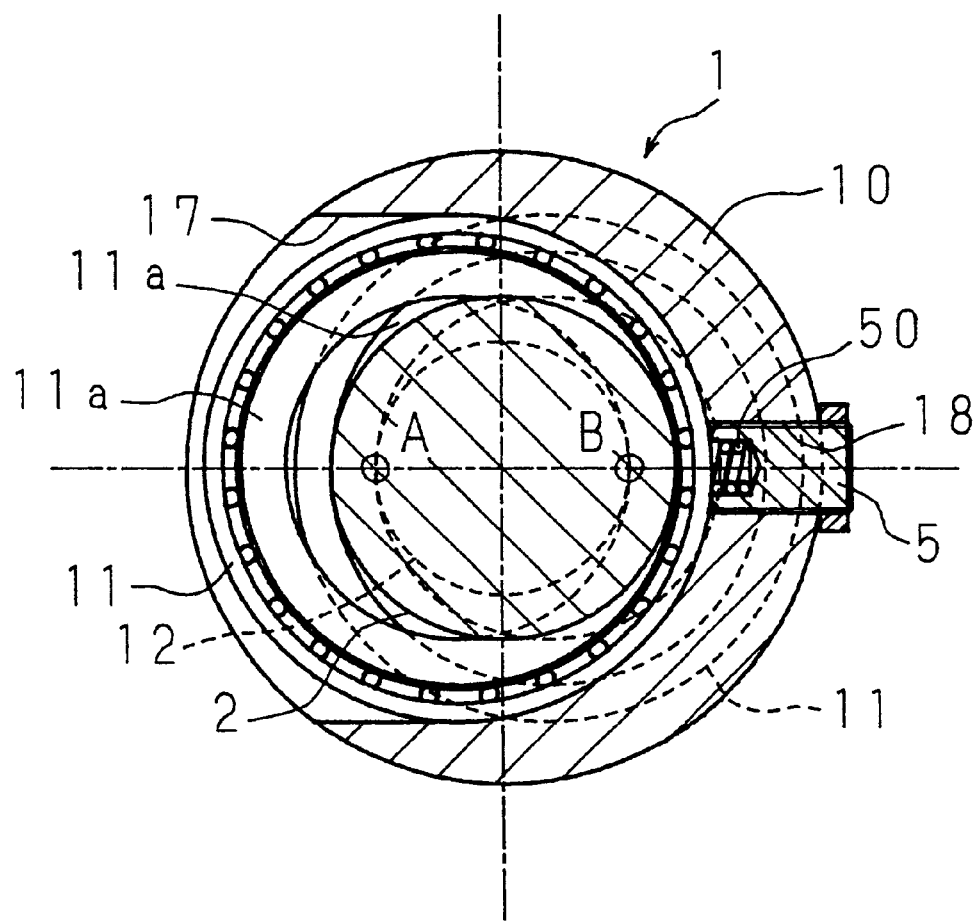
FIG. 4 is a transverse section taken along line IV—IV of FIG. 3.

FIG. 3 is a side view, partially in cross-section, showing the constitution of the movement transforming device 1, and FIG. 4 is a transverse section taken generally along line IV—IV of FIG. 3.

As shown in FIG. 3, the feed rings 11 held to the rotating cylinder 10 are ball bearings which hold a plurality of balls between their outer and inner rings and have an inner diameter sufficiently larger than the outer diameter of the rack shaft 2 inserted through the feed rings 11. Each feed ring 11 is mounted inside the rotating cylinder 10 so that its axial center is inclined with respect to the rotating cylinder 10. The entire inner circumferential surface of the inner ring of each feed ring 11 is formed with engaging projection 11a, having a semi-circular axial section form corresponding to a cross-section of the thread groove 12 formed on the outer circumference of the rack shaft 2. FIG. 3 illustrates a portion 13a of the inner ring of the four-point contact ball bearing 13, with a ball groove is provided therein.

The inclination angle of the axial center of each feed rings 11 is set so as to be substantially equal with a lead angle of the thread groove 12 formed on the outer circumference of the rack shaft 2. Moreover, each feed ring 11 is engaged with the thread groove 12 via the engagement projection 11a provided on the inner ring at a circumferential position where their inclination coincides with the inclination of the thread groove 12. Further, the two feed rings 11 on both outer sides of the rotating cylinder 10 and the one feed ring 11 in the center position are mounted with their inclination directions opposite to each other, and their engaging positions with the thread groove 12 are, as represented by A and B in FIG. 4, set so as to be opposite to each other in a radial direction, namely, a phase is differentiated by approximately 180° in the circumferential direction.

In the movement transforming device 1 having the above structure, the rotating cylinder 10 rotates on its axis according to the rotation of the motor 3 for steering assistance, and the three feed rings 11 held inside the rotating cylinder 10 are rotated by the rotation of the rotating cylinder 10. At this time, since the inner ring of each feed ring 11 is engaged with the thread groove 12 formed on the outer circumference of the rack shaft 2 via the engaging projection 11a provided on its inner periphery, the inner ring rolls along the thread groove 12 with the engagement condition being maintained. According to the rolling movement of the inner ring of each feed rings 11 since a force along the thread groove 12 is applied to the engagement position A or B of each feed ring 11, the rack shaft 2 is pressed by an axial component of the force so as to move in the axial direction.

According to such an operation of the movement transforming device 1, the rotation of the motor 3 for steering assistance is transformed into the movement of the rack shaft 2 in the axial direction inside the rack housing 20, and the movement is transmitted to the right and left tire wheels for steering via the tie rods, not shown. Therefore, the steering which is executed as mentioned above according to the operation of the steering wheel is assisted by the generating force of the motor 3.

The movement transforming device 1 as well as the motor 3 having the above configuration can be composed compactly and coaxially around the rack shaft 2. Moreover, the movement transforming device 1 has a simple structure such that the plurality of feed rings 11 are held inside the rotating cylinder 10 and the thread groove 12 is formed on the outer circumferential surface of the rack shaft 2 as the moving shaft. As a result, the movement transforming device 1 can achieve the greatly simplified structure compared with a ball-screw type movement transforming device.

In addition, the feed rings 11 are the ball bearings having a plurality of balls between their inner and outer rings, and the balls roll without changing their relative positions so that there is no possibility that they collide with each other. As a result, the operating sound is lower than the ball-screw type movement transforming device, and thus the operation can be performed quietly. Here, as the feed rings 11, roller bearings, which have rollers instead of the balls as the rolling bodies between the inner and outer rings, can be also used.

As mentioned above, the movement transforming device 1 of the present invention is an excellent device which is capable of realizing both the simple structure and the quiet operation, but in order to efficiently transform the rotation of the rotating cylinder 10 into the movement of the rack shaft 2 as the moving shaft in the axial direction, it is important to obtain the appropriate engagement condition between the feed rings 11 mounted to the rotating cylinder 10 and the thread groove 12 formed on the circumferential surface of the rack shaft 2, and further to easily perform an adjusting operation for making the engagement condition to be appropriate.

In the present invention, the feed rings 11 are mounted to the rotating cylinder 10 as mentioned below, and the appropriate engagement condition is obtained securely, and the adjusting operation for the appropriate engagement condition can be performed easily.

Figure 5:
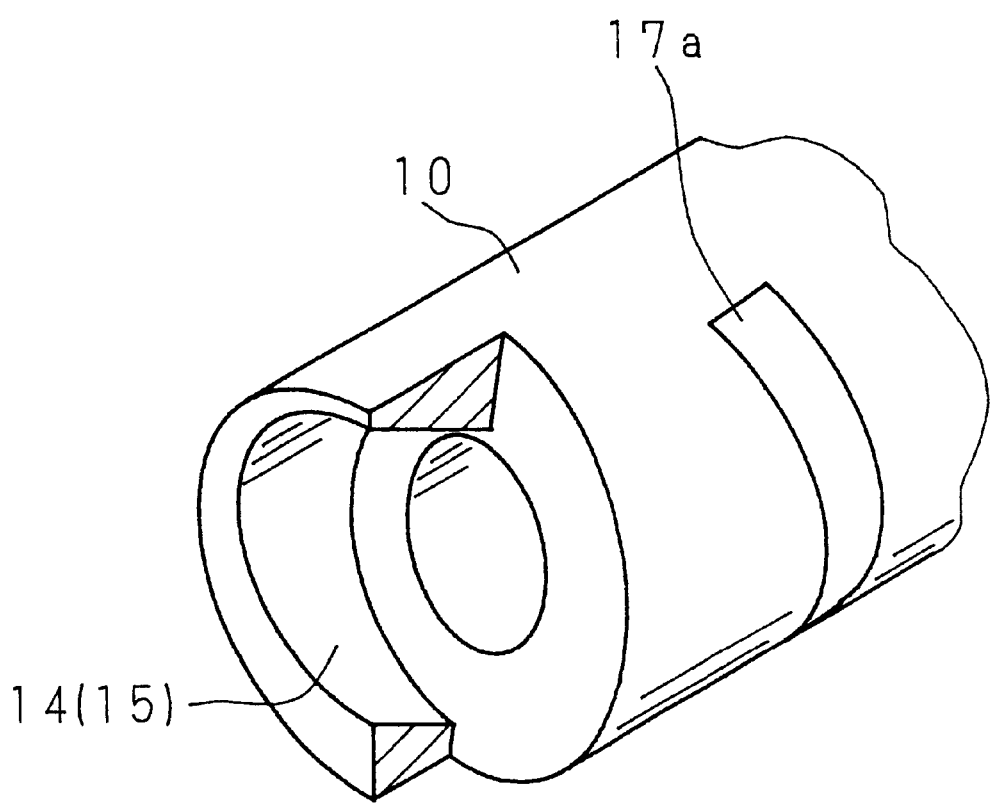
FIG. 5 is a perspective view, partially broken, of a end portion vicinity of a rotating cylinder of the movement transforming device in the first embodiment according to the present invention.

As shown in FIG. 3, a pair of mounting holes 14 and 15 as mounting portions for the feed rings 11 on both outer sides are formed on both ends of the rotating cylinder 10 so as to have openings respectively on both the end surfaces and have axial centers which are inclined with respect to the axial center of the rotating cylinder 10. The mounting holes 14 and 15 are circular holes having an inner diameter substantially equal with the outer diameter of the feed rings 11 to be mounted thereto, and their inclination angles coincide with the lead angle of the thread groove 12 formed on the rack shaft 2. Further, the mounting holes 14 and 15 are eccentric by a predetermined length in the uniform direction from the axial center of the rotating cylinder 10 in a plane which intersects perpendicularly to an axial cross-section where their inclination angles become maximum. FIG. 5 is an overall perspective view, partially broken, showing a vicinity of the end of the rotating cylinder 10, and the form of the mounting hole 14 (or mounting hole 15) is clear in this drawing.

The two feed rings 11 on both outer sides of the three feed rings 11 held to the rotating cylinder 10 are press-fitted respectively into the mounting holes 14 and 15 formed as mentioned above via the openings formed on both ends, and they are engaged with locking rings 16 mounted to the inner surfaces of the mounting holes 14 and 15 so as to be fixed thereto with their one sides coming into contact with bottom surfaces of the mounting holes 14 and 15.

Since the mounting holes 14 and 15 are formed so as to be eccentric in the uniform direction by a predetermined length from the axial center of the rotating cylinder 10, the feed rings 11 on both the outer sides mounted to the mounting holes 14 and 15 are engaged with the thread groove 12, formed on the outer circumference of the rack shaft 2 coaxially positioned inside the rotating cylinder 10, in the circumferential position where their inclination angles coincide with the lead angle of the thread groove 12 as shown in FIG. 4 and in the engaging position A on the same side in the radial direction. At this time, the two feed rings 11 are fitted respectively into the mounting holes 14 and 15 having a corresponding circular cross section so as to be fixed with their whole surface on the outer circumference being restricted. As a result, the engagement condition between the feed rings 11 and the thread groove 12 formed on the outer circumference of the rack shaft 2 is maintained firmly.

Meanwhile, the one center feed ring 11 of the three feed rings 11 held to the rotating cylinder 10 is mounted to a mounting portion 17 which is formed on an outer circumferential surface of a predetermined section of the rotating cylinder 10 so as to have a slit-shaped opening. The slit-shaped opening 17a of the mounting portion 17 which appears on the outer circumference of the rotating cylinder 10, as shown in FIG. 5, has a rectangular cross-section which is inclined with respect to the axial center of the rotating shaft 10 by an angle substantially equal with that of the mounting hole 14 formed at the end of the rotating cylinder 10 and in a direction different from the mounting hole 14.

Figure 6:
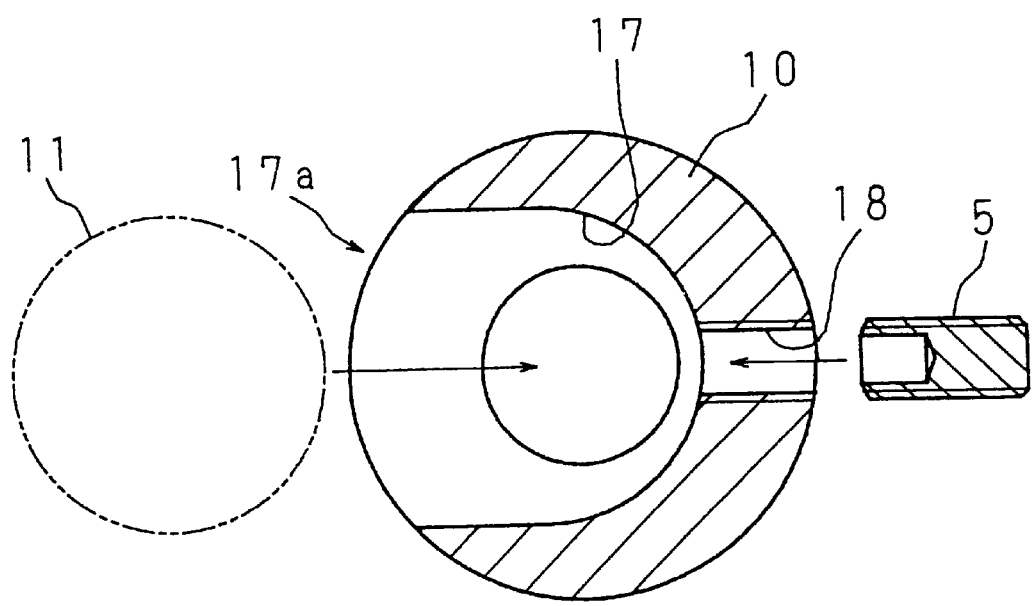
FIG. 6 is an explanatory diagram showing a mounting condition that a center feed ring of the movement transforming device in the first embodiment according to the present invention.

A size of the opening 17a of the mounting portion 17 corresponds to the side cross-section shape of the feed ring 11 to be mounted, and the center feed ring 11 is pushed from the outside of the rotating cylinder 10 into the mounting portion 17 along the inclination of the opening 17a so as to be mounted. FIG. 6 is the explanatory diagram of the mounted state of the center feed ring 11, and similarly to FIG. 4 roughly shows the transverse section of the rotating cylinder 10 in position where the mounting portion 17 is formed.

The mounting portion 17 has the axial center which is common with the rotating cylinder 10, and its semi-circular bottom surface corresponding to the outer diameter of the feed ring 11 serves as a concave section provided on the side opposite to the opening 17a. A screw hole 18, which pierces through a circumferential wall of the rotating cylinder 10 in the radial direction, is formed on a substantially central portion of the bottom surface of the mounting portion 17. An adjusting screw 5 as engagement adjuster means is fitted into the screw hole 18.

The center feed ring 11 is pushed into the mounting portion 17 formed as mentioned above via the opening 17a and is mounted thereto with the outer circumference on the inward side of the feed ring 11 coming in contact with the bottom surface of the mounting portion 17. Then, the center feed ring 11 in this state is engaged with the thread groove 12, formed on the outer circumference of the rack shaft 2 inserted into the rotating cylinder 10, via the engaging projection 11a provided around the inner ring in the engaging position B on the side same as the bottom surface, namely, in a position which is different in the circumferential direction from the engaging position A of the feed rings 11 on both outer sides.

This engagement condition is maintained by the contact between the semi-circular bottom surface of the mounting portion 17 and the outer ring of the half portion of the feed ring 11 on the same side, but it is difficult to accurately finish an inner surface shape of the mounting portion 17 having an axial cross-section as shown in FIG. 6. For this reason, in order to satisfactorily maintain the engagement at the engaging position B in terms of accuracy itself, high machining accuracy is required. Moreover, in the case where faulty engagement once occurs at the engaging position B, also the engagement conditions of the feed rings 11 on both the outer sides at the engaging position A cannot be maintained satisfactorily.

A point of the adjusting screw 5 fitted into the screw hole 18 on the bottom surface of the mounting portion 17 comes to the outer surface of the feed ring 11. A projecting length of the adjusting screw 5 to the inside of the mounting portion 17 can be increased and decreased, by rotating the adjusting screw 5 from the outside of the rotating cylinder 10. When the projected length of the adjusting screw 5 is increased, the feed ring 11 which contacts with the point is pressed in the axial direction of the adjusting screw 5, namely, in the radial direction of the rotating cylinder 10. As a result, the engaging projection 11a on the inner surface of the feed ring 11 is pressed against the thread groove 12 formed on the outer circumference of the rack shaft 2, and the engagement condition therebetween at the engaging position B is reinforced.

Further, when the adjusting screw 5 is rotated, the rack shaft 2 is pressed via the center feed ring 11 which contacts with the adjusting screw 5. As a result, a half portion on the other side of the rack shaft 2 is displaced in the radial direction of the rotating cylinder 10, and the thread groove 12 on the same side is pressed against the inner surfaces of the feed rings 11 on both the outer sides, and thus the engagement conditions therebetween at the engaging position A are reinforced.

When the adjusting screw 5 as the engagement adjuster means is rotated in such a manner, the engagement conditions between the three feed rings 11 held to the rotating cylinder 10 and the thread groove 12 formed on the circumferential surface of the rack shaft 2 are adjusted collectively. Since the adjusting screw 5 can be operated from the outer side of the rotating cylinder 10, the engagement can be adjusted with the adjusting screw 5 while being combined with the rack shaft 2 as the moving shaft. As mentioned above, the feed rings 11 on both the outer sides are supported respectively to the inner portions of the mounting holes 14 and 15 over their whole peripheries, and thus due to the action when the engagement is adjusted as mentioned above, there is no possibility that displacement occurs. As a result, the adjustment can be executed securely.

In the movement transforming device 1 of the present invention, the engagement conditions between the thread groove 12 formed on the outer circumference of the rack shaft 2 as the moving shaft and the plurality of feed rings 11 can be made to be easily appropriate and secure. Thus the rotation of the rotating cylinder 10 which is caused by the transmission from the motor 3 is transformed into the movement of the rack shaft 2 as the moving shaft in the axial direction efficiently.

Here, as shown in FIG. 4, a coil spring 50 is incorporated into the pointing portion of the adjusting screw 5. The contact of the adjusting screw 5 with the outer surface of the feed ring 11 is obtained via the coil spring 50. Such a constitution makes it possible to maintain the appropriate engagement condition according to external disorder such as deflection of the rack shaft 2, and thus the movement transformation can be executed efficiently.

In the first embodiment of the present invention described above, the three feed rings 11 are held to the inside of the rotating cylinder 10, however the movement transforming device 1 of the present invention can adopt a constitution where more than three feed rings 11 are provided.

Figure 7:
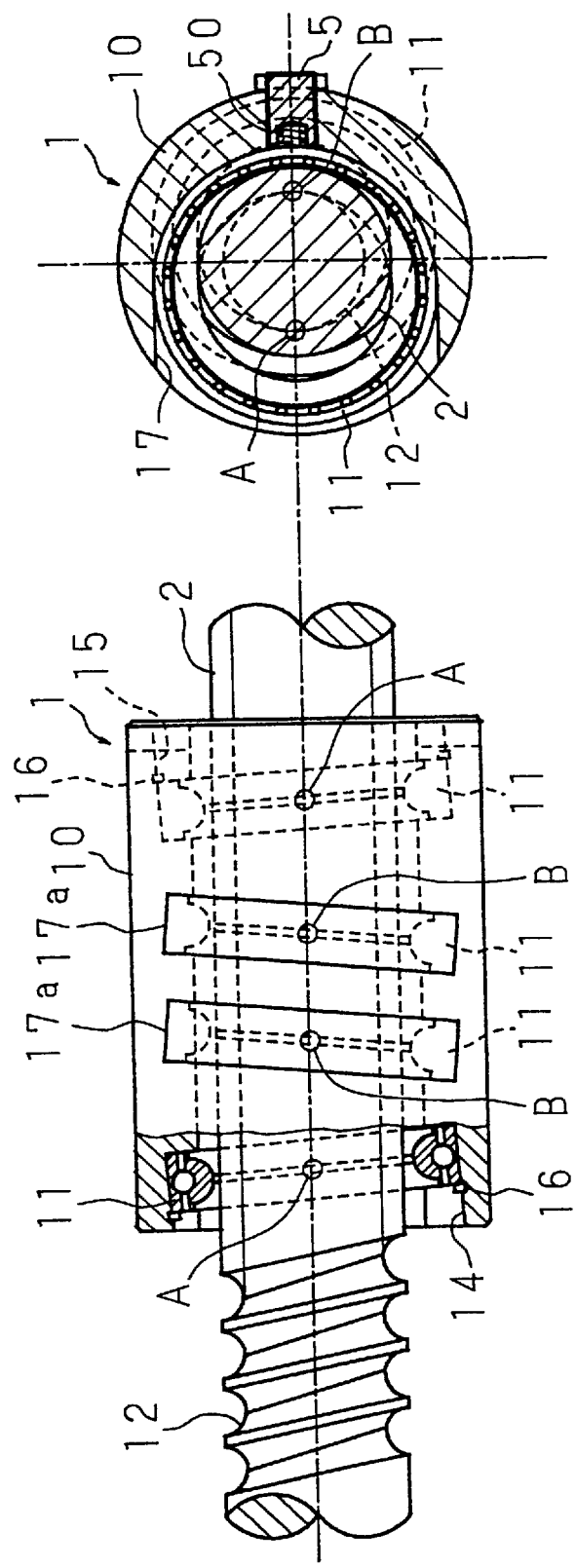
FIG. 7A is a side view of another constitutional example of the movement transforming device in the first embodiment according to the present invention.
FIG. 7B is a front cross-section of another constitutional example of the movement transforming device in the first embodiment according to the present invention.
Figure 8:
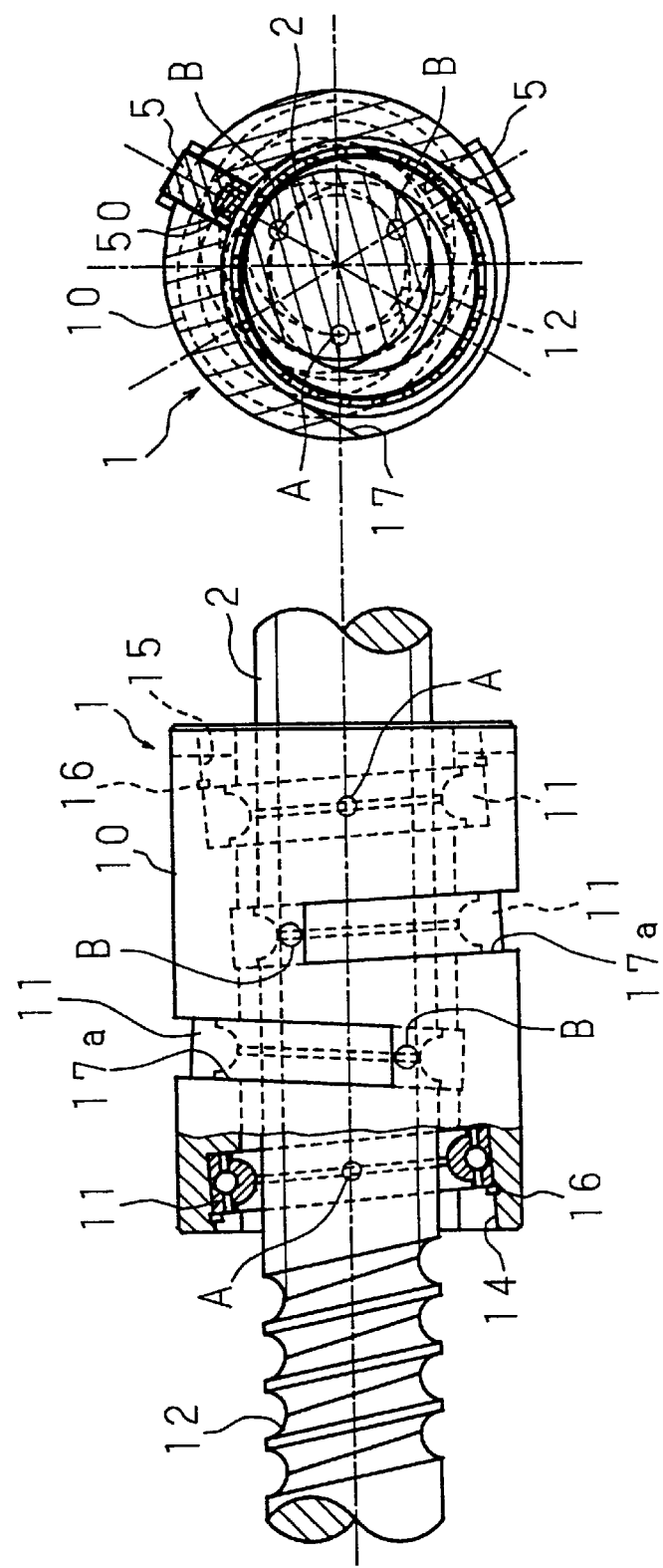
FIG. 8A is a side view of another constitutional example of the movement transforming device in the first embodiment according to the present invention.
FIG. 8B is a front cross-section of another constitutional example of the movement transforming device in the first embodiment according to the present invention.

FIGS. 7A, 7B, 8A, and 8B show another constitutional examples of the movement transforming device in the first embodiment according to the present invention, more specifically shows a constitutional example of the movement transforming device 1 having the four feed rings 11. FIGS. 7A and 8A are side views, and FIGS. 7B and 8B are front sectional views.

In the movement transforming device 1 shown in these drawings, the two feed rings 11 positioned in both outer sides of the four feed rings 11 are mounted to the mounting holes 14 and 15 which are formed on both the end surfaces of the rotating cylinder 10 so as to have openings corresponding to the axial cross sections. Moreover, the two feed rings 11 on the inner side of the four feed rings 11 are mounted to the mounting portions 17 which are formed on the circumferential wall of the rotating cylinder 10 in a predetermined position so as to have the slit-shaped openings 17a corresponding to the side surface shape of the feed rings 11.

In the movement transforming device 1 shown in FIGS. 7A and 7B, the engaging position A of the two feed rings 11 on both the outer sides and the engaging position B of the two feed rings 11 on the inner side are set so that their phases are differentiated from each other by 180°. Moreover, the adjusting screw 5 of the engagement adjuster means is brought into contact with one or both of the two feed rings 11 on the inner side. When the adjusting screws 5 are rotated from the outside of the rotating cylinder 10 so as to pressurize the feed rings 11 on the inner side, the engagement conditions of the four feed rings 11 can be adjusted collectively.

On the contrary, in the movement transforming device 1 shown in FIGS. 8A and 8B, the engaging positions of the four feed rings 11 are set so as to be separated from each other in the circumferential direction by a phase of 120°. Moreover, the two feed rings 11 on the inner side are brought into contact with the adjusting screws 5 as the engagement adjuster means. When these adjusting screws 5 are rotated from the outside of the rotating cylinder 10 relatedly to each other and the two feed rings 11 on the inner side are pressed in respective directions, the engagement conditions of the four feed rings 11, 11 . . . are adjusted collectively.

There will be described below the movement transforming device and the power steering apparatus using the movement transforming device according to a second embodiment of the present invention.

Figure 9:
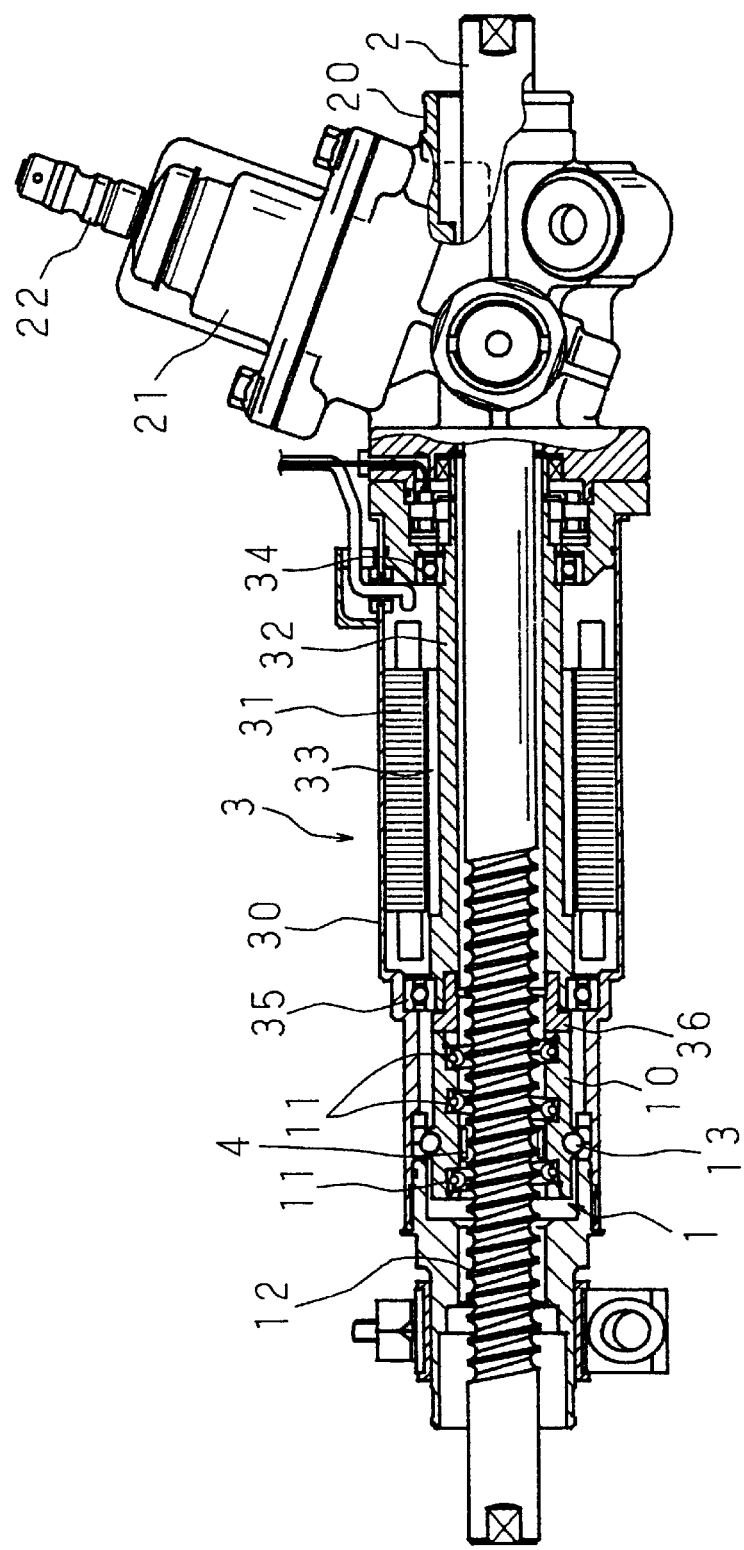
FIG. 9 is a front view, partially in cross-section, of a constitution of an essential portion of the power steering apparatus in a second embodiment having the movement transforming device according to the present invention.
Figure 10:
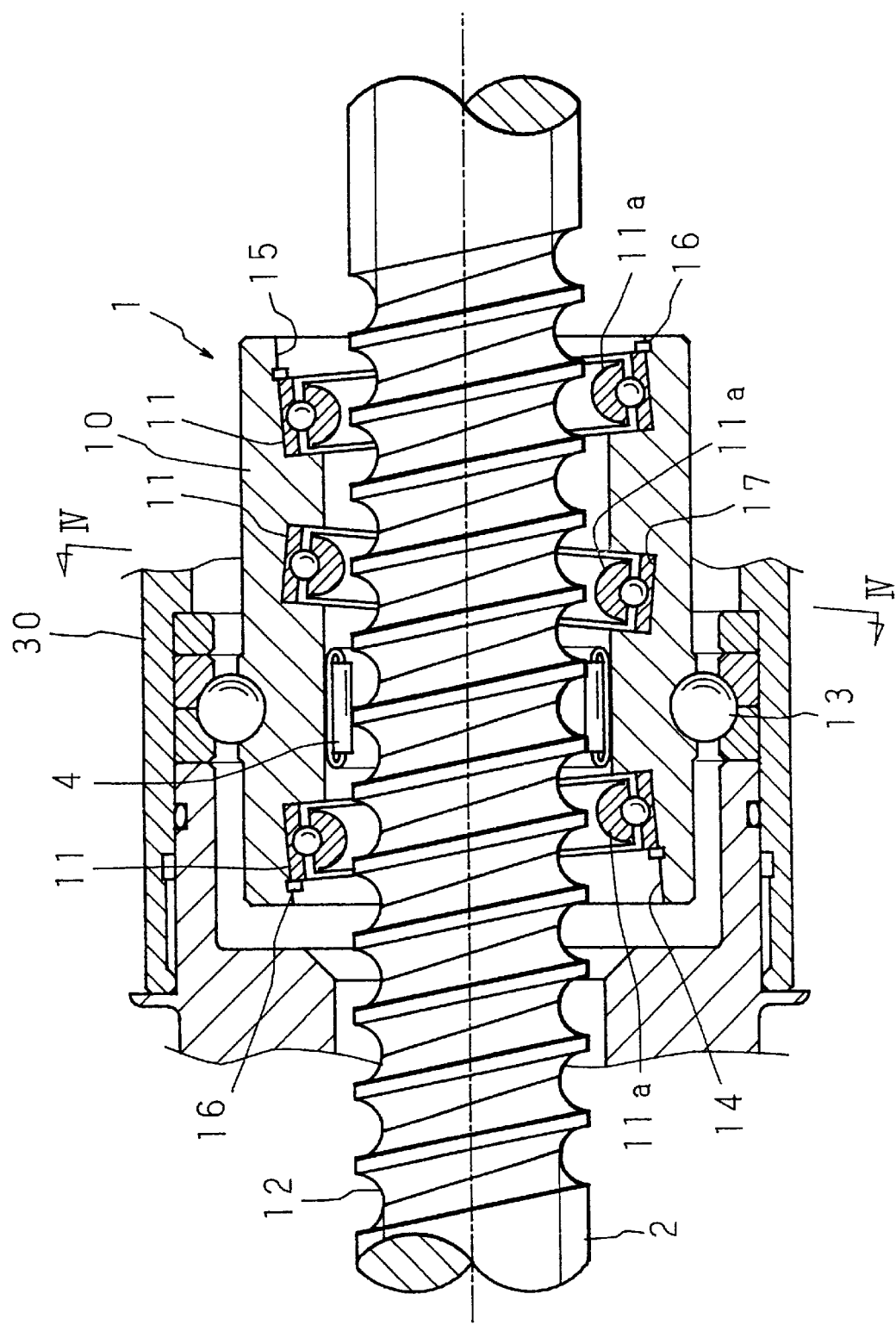
FIG. 10 is a side view, partially cross-section, of a constitution of the movement transforming device in the second embodiment according to the present invention.

FIG. 9 is a front view, partially in cross-section, showing a constitution of an essential portion of the movement transforming device and the power steering apparatus using the movement transforming device in the second embodiment according to the present invention. FIG. 10 is an enlarged cross section of the essential portion showing the constitution of the movement transforming device 1. Here, a transverse cross section taken along line IV—IV is similar to FIG. 4 in the first embodiment. Moreover, in FIGS. 2 through 8 showing the first embodiment and the drawings showing the second embodiment below, the same reference numerals are given to identical portions or corresponding portions so that the description thereof is omitted.

In the second embodiment, as shown in FIGS. 9 and 10, a bearing 4 is fitted and held inside the rotating cylinder 10 between the feed ring 11 on the one outer side and the center feed ring 11. Then, the bearing 4 comes in contact with the outer circumferential surface of the rack shaft 2 so as to bear a radial load which is acted on the rack shaft 2. Here, in the shown example, the bearing 4 is constituted so that a plurality of rollers with small diameters are arranged and held onto its inner periphery, and the respective rollers are rolled to contact with the outer circumference of the rack shaft 2 so that the bearing 4 serves as a needle-type roll bearing which bears the radial load. However, the bearing 4 may be any bearing which bears the radial load, so another type of rolling bearings such as a ball bearing and roller bearing may be used. Further, also a slide bearing can be used.

In addition, as shown in the drawings, the held position of the bearing 4 inside the rotating cylinder 10 is aligned with the position where the rotating cylinder 10 is supported to the motor housing 30, namely, the supporting position by means of the four-point contact ball bearing 13 in the axial direction. As a result, the rack shaft 2 is supported by the bearing 4 to a position where it substantially coincides with the four-point contact ball bearing 13 in the axial direction.

An external force such as a road reaction force via the tire wheels for steering is applied to the rack shaft 2 and the radial load which directs various directions is acted thereon, but in the movement transforming device 1 having the above structure according to the second embodiment of the present invention, the bearing 4 fitted and held in the rotating cylinder 10 bears such radial load. For this reason, the radial direction position of the rack shaft 2 with respect to the rotating cylinder 10 can be maintained, and the engagement conditions of the feed rings 11 held to the rotating cylinder 10 and the thread groove 12 formed on the outer circumference of the rack shaft 2 is maintained satisfactorily. Therefore, the above-mentioned movement transformation can be executed securely.

Here, the thread groove 12 is formed on the outer circumferential surface of the rack shaft 2 with which the bearing 4 rolls and comes in contact, and a shoulder portion of the thread groove 12 engages the bearing 4 and does not relatively move with respect to the bearing 4 in the axial direction. Therefore, friction due to the sliding-contact with the thread groove 12 is not generated on a bearing 4, and thus the satisfactory supporting state can be maintained stably. As a result, there is no possibility that the thread groove 12 is damaged, and thus the engagement condition with the bearing 4 can be maintained satisfactorily.

In addition, since the supported position of the rack shaft 2 by means of the bearing 4 is aligned with the supported position of the rotating cylinder 10 by means of the four-point contact ball bearing 13 in the axial direction, due to the radial load bore by the bearing 4, there is no possibility that a rotating moment in the axial direction is not generated about the supporting position of the four-point contact ball bearing 13 in the rotating shaft 10. For this reason, the supported condition of the rotating cylinder 10 and the supported condition of the feed rings 11 in the rotating cylinder 10 become stable so that the above-mentioned movement transformation can be executed more securely.

In addition, since the bearing 4 is provided, it is not necessary that each of the feed rings 11 bears the radial load, and thus the feed ring 11 may bear only a force acting to the engaging portion with the thread groove 12. For this reason, the feed rings 11 and the rotating cylinder 10 holding them can be miniaturized, and the movement transforming device 1 as well as the motor 3 having the aforementioned structure can be constituted compactly and coaxially about the rack shaft 2.

Figure 11:
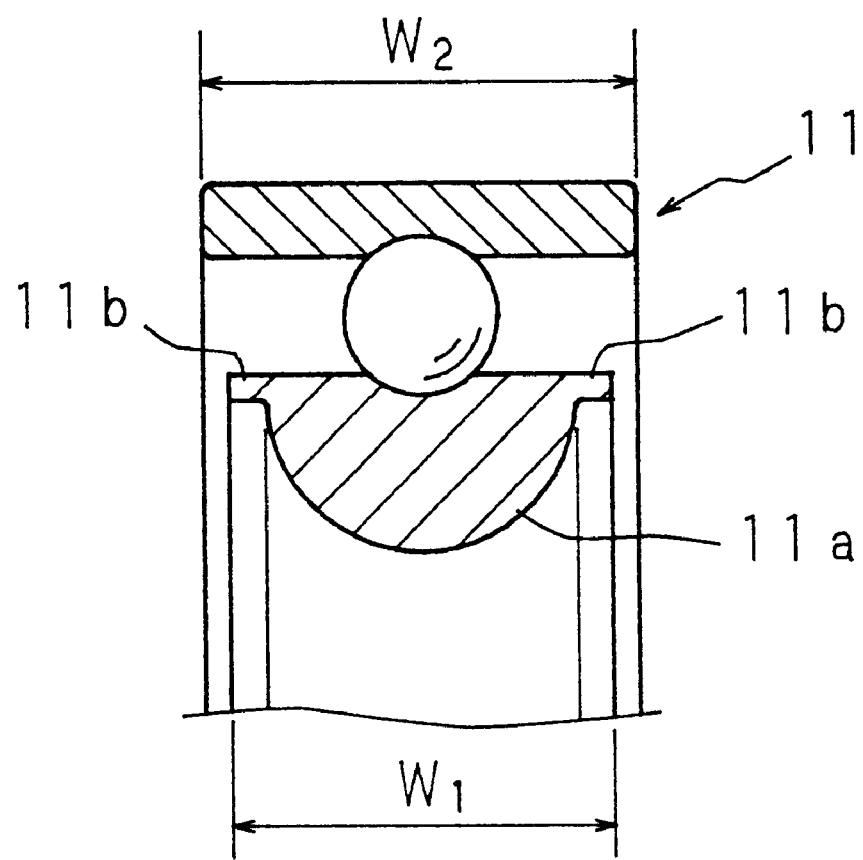
FIG. 11 is an enlarged cross-section of the feed ring of the movement transforming device in the second embodiment according to the present invention.

FIG. 11 is an enlarged cross section of the feed ring 11 in the movement transforming device according to the second embodiment of the present invention.

As shown in FIG. 11, the inner ring of the feed ring 11 is constituted so that collar edges 11b are provided on both the sides of the engaging projection 11a having a semi-circular cross section to be engaged with the thread groove 12. A width $W_1$ of the inner ring including the collar edges 11b is set to be narrower than a width $W_2$ of the outer ring. As mentioned above, since the feed ring 11 is mounted to the mounting holes 14 or 15 or the mounting portion 17 formed in the rotating cylinder 10 with its axial center being inclined, portions of the bottom surfaces of the mounting holes 14 and 15 or the side surface of the mounting portion 17 face the side edge of the inner ring of the feed ring 11. However, when the width $W_1$ is set as mentioned above, the inner ring of the feed ring 11 does not come in contact with the bottom surface of the mounting holes 14 or 15 or the side surface of the mounting portion 17, and there is no possibility of interferences of the rolling movement of the feed ring 11 along the thread groove 12.

In the second embodiment described above, the three feed rings 11 are held inside the rotating cylinder 10, but in the movement transforming device 1 according to the second embodiment of the present invention, similarly to the first embodiment, two or three or more feed rings 11 may be provided.

Figure 12:
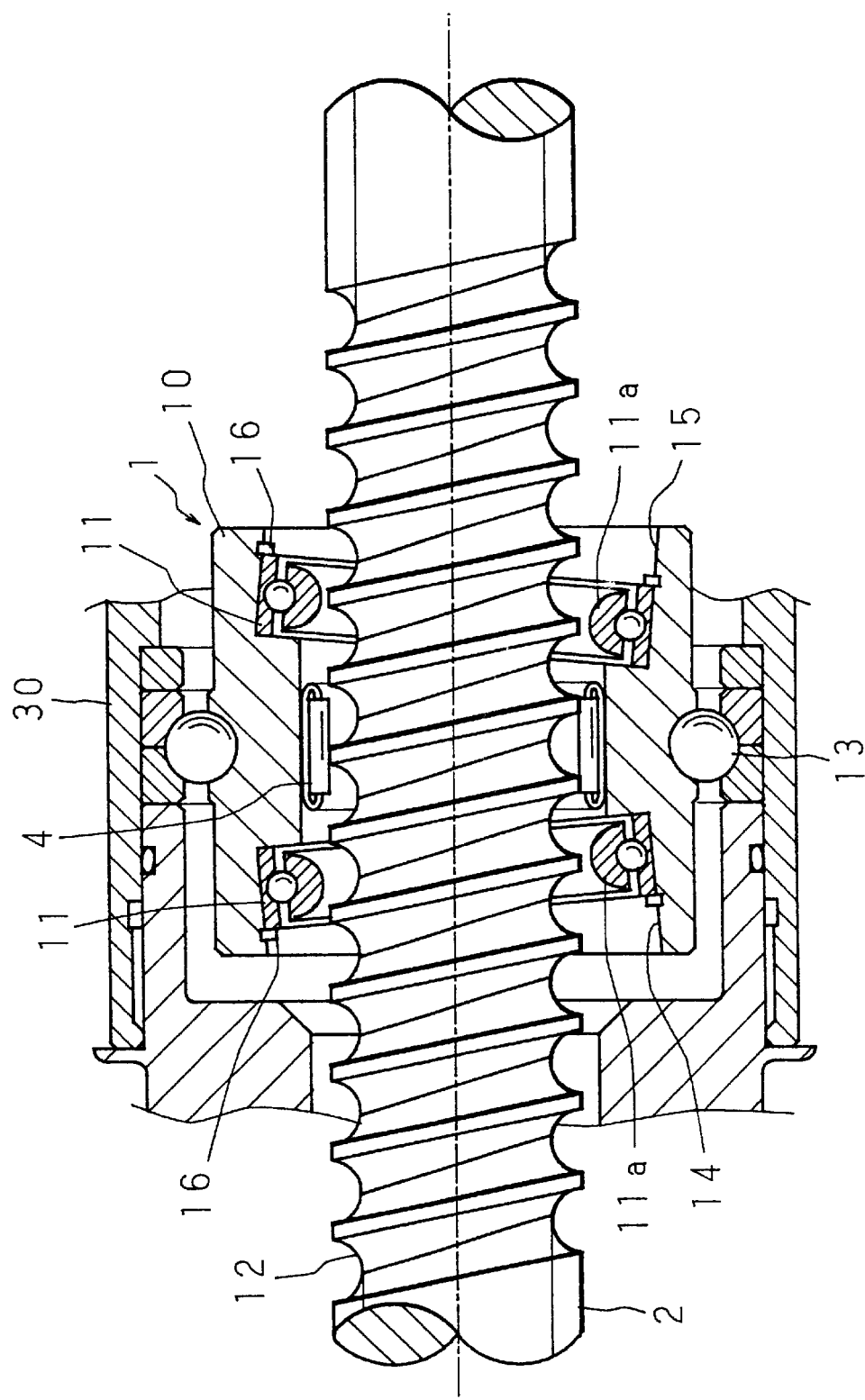
FIG. 12 is an enlarged cross-section of another constitutional example of an essential portion of the movement transforming device in the second embodiment according to the present invention.

FIG. 12 is a sectional view showing a constitutional example of the movement transforming device 1 in the second embodiment according to the present invention having the two feed rings 11. In this constitutional example, the two feed rings 11 are pressed into the mounting holes 14 and 15 which are formed on both end surfaces of the rotating cylinder 10 with the rings being inclined in opposite directions, and are held by locking rings 16 engaged with the inner surface of the mounting holes 14 and 15 so as not to slip off. The two feed rings 11 are engaged with the thread groove 12 formed on the outer circumference of the rack shaft 2 with the engaging projections 11a provided on the inner surfaces of the feed rings 11 being engaged with positions where phase is differentiated by 180° in the circumferential direction.

Also in the constitutional example shown in FIG. 12, the bearing 4 is fitted and fixed inside the rotating cylinder 10 so as to positioned between the two feed rings 11, and is brought into contact with the outer circumferential surface of the rack shaft 2, and the bearing 4 bears the radial load applied from the rack shaft 2.

In the second embodiment the rotation of the rotating cylinder 10 which is transmitted from the motor 3 for steering assistance is transformed into the movement of the rack shaft 2 in the axial direction in the engaging portion between the two feed rings 11 and the thread groove 12, but since the radial load applied to the rack shaft 2 at this time is bore by the bearing 4, the movement transformation can be executed securely without using large-size feed rings 11.

Here, the first and second embodiments described the application examples which are used for transmitting the rotation of the motor 3 for steering assistance to the rack shaft 2 as the moving shaft in the rack-and-pinion type power steering apparatus, but the movement transforming device 1 of the present invention is not limited to this. Therefore, the movement transforming device 1 can be applied to various types of power steering apparatuses which are constituted so that the rotation of a motor for steering assistance to a steering shaft for steering is provided by means of the movement in the axial direction. Further, needless to say, the device can be applied to any transmission mechanisms which requires the transformation from rotational movement into linear movement or from linear movement into rotational movement.

In the movement transforming device according to the first embodiment of the present invention detailed above, the three or more feed rings are held inside the rotating cylinder which rotates on its axis, and the two feed rings positioned on both outer sides in the axial direction are fitted to be mounted into mounting portions formed on the both end surfaces of the rotating cylinder, and the center feed ring is pushed to be mounted into the mounting portion which is formed in a predetermined halfway position of the rotating cylinder so as to have a slit-shaped opening. Their inner circumferential surfaces are engaged with the thread grove formed on the outer circumference of the moving shaft. As a result, the processing and assembly for mounting the feed rings become easy so that a number of the steps is decreased. Moreover, the position of the center feed ring is adjusted with rigidity being maintained by the feed rings on both outer sides whose whole outer peripheries are restricted so that the engagement condition can be made to be suitable. For this reason, the firm engagement between the feed rings held inside the rotating cylinder and the thread groove formed on the outer circumference of the moving shaft is realized securely, and the rotational movement of the rotating cylinder can be transformed into linear movement of the moving shaft and vice versa efficiently and securely.

In addition, since the engaging position of the center ring and the engaging position of the feed rings on the both outer sides are set in different positions in the circumferential direction, when the center feed ring is pressed and the engagement is adjusted by the operation of the engagement adjuster means, the engagement conditions of feed rings on the both outer sides are made to be suitable collectively, and thus trouble and labor required for the adjustment can be reduced.

Further, in the power steering apparatus according to the first embodiment of the present invention, the movement transforming device is used for transforming the rotation of the motor for steering assistance into the movement of the steering shaft in the axial direction. For this reason, a transmission mechanism which covers a range from the motor to the steering shaft can be arranged compactly around the steering shaft, and thus the transmission to the steering shaft is performed securely and efficiently. Moreover, a quiet apparatus where operating noises are low can be realized so that the present invention provides excellent effects.

In addition, in the movement transforming device according to a second embodiment of the present invention, the bearing which is fitted and held inside the rotating cylinder is brought into contact with the outer circumference of the moving shaft so as to stand the radial load applied to the moving shaft. As a result, it is not necessary for the feed rings which are engaged with the thread groove formed on the outer circumference of the moving shaft to stand the radial load. For this reason, the rotational movement of the rotating cylinder can be transformed into the linear movement of the moving shaft and vice versa securely by the compact structure using the feed rings with small size. Moreover, since the relative engaging position between the shoulder portion of the thread groove and the feed rings does not change with respect to the rotating cylinder which rotates their outside, the thread groove comes in contact with the bearing without changing the relative position. For this reason, a friction due to their sliding-contact is not generated, and thus the satisfactory supporting state is maintained stably.

In addition, since the bearing inside the rotating cylinder is positioned in a position where it is aligned with the supported position of the rotating cylinder to the housing, rotational moment is not generated in the rotating cylinder due to the radial load applied to the bearing. As a result, the rotational movement of the rotating cylinder can be transformed into the linear movement of the moving shaft and vice versa more securely.

Further, in the power steering apparatus according to the second embodiment of the present invention, since the above movement transforming device is used, the transmission mechanism which covers a range from the motor for assisting the steering to the steering shaft can be constituted compactly around the steering shaft. Moreover, the transmission to the steering shaft is executed efficiently and securely, and a quiet operation, namely, low operating noise can be realized so that the present invention displays excellent effects.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A movement transforming device, comprising:

a moving shaft, supported inside a housing movably in the axial direction, having a thread groove formed on a circumferential surface thereof;

a rotating cylinder, supported inside the housing rotatable on its axis, coaxially enclosing said moving shaft;

three or more feed rings, having their axial centers inclined by an angle substantially equal with a lead angle of the thread groove, eccentrically held inside said rotating cylinder, each being engaged with the thread groove at a circumferential position of its inner circumferential surface;

whereby rolling movement of said three or more feed rings along the thread groove transforms rotation of said rotating cylinder axial into movement of said moving shaft or the axial movement of said moving shaft into rotary movement of said rotating cylinder, and wherein said three or more feed rings are arranged along the axial direction of said rotating cylinder, the two of said three or more feed rings on both ends are fitted into mounting portions, which are formed on both end surfaces of said rotating cylinder so as to have circular openings corresponding to axial cross sectional shapes of the two feed rings, via the respective openings, the rest of the feed rings is fitted into a mounting portion, which is formed in a halfway portion of the circumferential wall of said rotating cylinder so as to have a slit-shaped opening corresponding to a side elevational shape of said rest of the feed rings, via the opening.

2. The movement transforming device according to claim 1, wherein an engaging position between said rest of the feed rings and said thread groove is set in an opposite side to the opening of the mounting portion so as to be at a different position in the circumferential direction to engaging positions of the two feed rings on both ends, further comprising an engagement adjuster, being mounted to the circumferential wall of said rotating cylinder, for pressing the outer circumference of said rest of the feed rings towards the opening of the mounting portion so as to collectively adjust the engagement conditions of said three or more feed rings with the thread groove.

3. A power steering apparatus, comprising:

a motor to be driven according to steering;

a steering shaft, supported inside a housing movably in the axial direction, having a thread groove formed on a circumferential surface thereof;

a rotating cylinder, supported inside the housing rotatably on its axis, coaxially enclosing said steering shaft, being rotated by transmission from said motor; and three or more feed rings, having their axial centers inclined by an angle substantially equal with a lead angle of the thread groove, eccentrically held inside said rotating cylinder, each being engaged with the thread groove at a circumferential position of its inner circumferential surface;

whereby rolling movement of said three or more feed rings along the thread groove transforms rotation of said rotating cylinder due to the transmission of said motor into movement of said steering shaft in the axial direction so as to assist steering, wherein said three or more feed rings are arranged along the axial direction of said rotating cylinder, the two of said three or more feed rings on both ends are fitted into mounting portions, which are formed on both end surfaces of said rotating cylinder so as to have circular openings corresponding to axial cross sectional shapes of the two feed rings, via the respective openings, the rest of the feed rings is fitted into a mounting portion, which is formed in a halfway portion of circumferential wall of said rotating cylinder so as to have slit-shaped opening corresponding to a side elevational shape of said rest of the feed rings, via the opening.

4. The power steering apparatus according to claim 3, wherein an engaging position between said rest of the feed rings and said thread groove is set in an opposite side to the opening of the mounting portion so as to be at a different position in the circumferential direction to engaging positions of the two feed rings on both ends, further comprising an engagement adjuster, being mounted to the circumferential wall of said rotating cylinder, for pressing an outer circumference of said rest of the feed rings towards the opening of the mounting portion so as to collectively adjust the engagement conditions of said three or more feed rings with the thread groove.

5. A movement transforming device, comprising:

a moving shaft, supported inside a housing movably in the axial direction, having a thread groove formed on a circumferential surface thereof, a rotating cylinder, supported inside the housing rotatably on its axis, coaxially enclosing said moving shaft;

a feed ring, having its axial center inclined by an angle substantially equal with a lead angle of the thread groove, eccentrically held inside said rotating cylinder, being engaged with the thread groove at a circumferential position of its inner circumferential surface;

whereby rolling movement of said feed ring along the thread groove transforms rotation of said rotating cylinder into axial movement of said moving shaft, or transforms the axial movement of said moving shaft into rotating movement of said rotating cylinder, and a bearing, fitted inside said rotating cylinder, for withstanding a radial load applied to said moving shaft by coming into contact with the circumference of said moving shaft, wherein said bearing is held inside said rotating cylinder and is aligned with a supported position of said rotating cylinder inside the housing in the axial direction.

6. A power steering apparatus, comprising:

a motor to be driven according to steering;

a steering shaft, supported inside a housing movably in the axial direction, having a thread groove formed on a circumferential surface thereof;

a rotating cylinder, supported inside the housing rotatably on its axis, coaxially enclosing said steering shaft, being rotated by transmission from said motor;

a feed ring, having its axial center inclined by an angle substantially equal with a lead angle of the thread groove, eccentrically held inside said rotating cylinder, being engaged with the thread groove at a circumferential position of its inner circumferential surface;

whereby rolling movement of said feed ring along the thread groove transforms rotation of said rotating cylinder due to the transmission of said motor into movement of said steering shaft in the axial direction so as to assist steering, and a bearing, fitted inside said rotating cylinder, for withstanding a radial load applied to said moving shaft by coming into contact with the circumference of said moving shaft, wherein said bearing is held inside said rotating cylinder and is aligned with a supported position of said rotating cylinder inside the housing in the axial direction.

\* \* \* \* \*